US010962346B2

(12) United States Patent
Miyako et al.

(10) Patent No.: US 10,962,346 B2
(45) Date of Patent: Mar. 30, 2021

(54) APPARATUS AND METHOD FOR OBTAINING INFORMATION ON ROTATION OF DC COMMUTATOR MOTOR (71) Applicant: ALPS ALPINE CO., LTD., Tokyo (JP)

(72) Inventors: Ikuyasu Miyako, Miyagi (JP); Tsutomu Abe, Miyagi (JP)

(73) Assignee: ALPS ALPINE CO., LTD., Tokyo (JP)

( * ) Notice: Subject to any disclaimer, the term of this patent is extended or adjusted under 35 U.S.C. 154(b) by 65 days.

(21) Appl. No.: 16/449,941

(22) Filed: Jun. 24, 2019

(65) Prior Publication Data
US 2019/0310068 A1 Oct. 10, 2019

Related U.S. Application Data (63) Continuation-in-part of application No. PCT/JP2017/043477, filed on Dec. 4, 2017.

(30) Foreign Application Priority Data

Dec. 28, 2016 (JP) .............................. JP2016-256129

(51) Int. Cl.
*G01B 7/30* (2006.01)
*G01P 3/44* (2006.01)
*H02P 6/16* (2016.01)

(52) U.S. Cl.
CPC .................. *G01B 7/30* (2013.01); *G01P 3/44* (2013.01); *H02P 6/16* (2013.01)

(58) Field of Classification Search
CPC ..... G01B 7/30; G01P 3/44; H02P 6/16; H02P 2203/09; H02P 2203/05; H02P 7/0094; H02P 6/182

(Continued)

(56) References Cited

U.S. PATENT DOCUMENTS 6,081,087 A * 6/2000 Iijima ...................... H02P 6/16
                                                    318/400.13
9,151,830 B2 * 10/2015 Bridges ................. G01B 11/03
(Continued)

FOREIGN PATENT DOCUMENTS

JP       H06-311773              11/1994
JP       H11187687 A  * 12/1997  ................ H02P 5/06
(Continued)

OTHER PUBLICATIONS

International Search Report dated Feb. 13, 2018 in PCT/JP2017/043477 filed on Dec. 4, 2017.

*Primary Examiner* — Tung X Nguyen
*Assistant Examiner* — Robert P Alejnikov, Jr.
(74) *Attorney, Agent, or Firm* — IPUSA, PLLC (57) ABSTRACT A motor module includes a motor including a commutator, and an apparatus that is attached to the motor and obtains information on rotation of the motor. The apparatus includes a rotation angle calculator that calculates a rotation angle of the motor based on a voltage between terminals of the motor and an electric current flowing through the motor, a first signal generator that generates a first signal based on a ripple component included in the electric current flowing through the motor, a second signal generator that generates a second signal indicating that the motor has rotated by a predetermined angle based on the first signal and the rotation angle, and a rotation information calculator that calculates the information on the rotation of the motor based on an output from the second signal generator.

10 Claims, 8 Drawing Sheets (58) Field of Classification Search
USPC .......................................................... 324/71.1
See application file for complete search history.

(56) References Cited

U.S. PATENT DOCUMENTS

| | | | | |
|---|---|---|---|---|
| 9,982,619 | B2* | 5/2018 | Mikawa | ................... F01L 1/352 |
| 2001/0048281 | A1* | 12/2001 | Aoki | ..................... H02P 7/2805 |
| | | | | 318/470 |
| 2005/0033547 | A1* | 2/2005 | Morishita | .............. H02K 11/21 |
| | | | | 702/147 |
| 2011/0262112 | A1* | 10/2011 | Tanaka | ................... H02K 11/20 |
| | | | | 388/811 |
| 2012/0217910 | A1* | 8/2012 | Kawano | ................... H02P 21/06 |
| | | | | 318/400.02 |
| 2014/0225542 | A1* | 8/2014 | Omata | .................... H02P 21/22 |
| | | | | 318/400.09 |
| 2017/0080568 | A1* | 3/2017 | Yu | .............................. H02P 5/68 |
| 2018/0062548 | A1* | 3/2018 | Ikenaga | ................. H02P 6/153 |
| 2018/0309399 | A1* | 10/2018 | Kitagawa | ................ H02P 21/22 |
| 2020/0041583 | A1* | 2/2020 | Cadugan | ............ G01R 33/0094 |

FOREIGN PATENT DOCUMENTS

| | | | | |
|---|---|---|---|---|
| JP | H11-187687 | | 7/1999 | |
| JP | 2002-058274 | | 2/2002 | |
| JP | 2005-261134 | | 9/2005 | |
| JP | 2005-323488 | | 11/2005 | |
| JP | 2005323488 | A * | 11/2005 | ............ H02P 7/0094 |
| JP | 2014-007807 | | 1/2014 | |

* cited by examiner

APPARATUS AND METHOD FOR OBTAINING INFORMATION ON ROTATION OF DC COMMUTATOR MOTOR

CROSS-REFERENCE TO RELATED APPLICATIONS

The present application is a continuation-in-part application filed under 35 U.S.C. 111(a) claiming benefit under 35 U.S.C. 120 and 365(c) of PCT International Application No. PCT/JP2017/043477, filed on Dec. 4, 2017, which is based on and claims priority to Japanese Patent Application No. 2016-256129 filed on Dec. 28, 2016, the entire contents of which are incorporated herein by reference.

BACKGROUND OF THE INVENTION

1. Field of the Invention

This disclosure relates to an apparatus and a method for obtaining information on the rotation of a DC commutator motor.

2. Description of the Related Art

There exists a known apparatus that obtains the rotation amount of a motor based on a ripple component included in an electric current flowing through the motor (see Japanese Laid-Open Patent Publication No. 2005-261134). This apparatus generates pulse signals having a frequency that is the same as the frequency of the ripple component, and counts the number of the pulse signals to obtain the rotation amount of the motor. Thus, this apparatus can obtain the rotation amount with certain accuracy while the motor is rotating at a constant rotational angular velocity. However, when, for example, the motor is rotating by inertia after the power is turned off and the ripple component is becoming small, the apparatus cannot obtain the rotation amount with accuracy.

There is another known apparatus that can obtain the rotation amount of a motor even when the ripple component is small (see Japanese Laid-Open Patent Publication No. 2005-323488). This apparatus can accurately obtain the rotation amount of a motor by correcting the number of pulse signals based on an integral of a counter electromotive voltage calculated based on an electric current flowing through the motor and a voltage between terminals of the motor.

Specifically, when an actual integral obtained when a pulse signal is generated is significantly smaller than an average integral during one period of a ripple component, the apparatus treats the pulse signal as an error pulse and decrements the number of pulse signals. Also, when an actual integral obtained after a predetermined time from when the previous pulse signal is generated is significantly greater than the average integral, the apparatus determines that there has been a failure in generating a pulse signal and increments the number of pulse signals.

However, the apparatus described in Japanese Laid-Open Patent Publication No. 2005-323488 cannot increment the number of pulse signals until a period of time, which is sufficient to indicate the stop of the motor, passes. Therefore, the apparatus may not be able to obtain an accurate rotation amount at an appropriate timing and may not be able to obtain a reliable rotation amount.

SUMMARY OF THE INVENTION

An aspect of this disclosure provides a motor module including a motor that includes a commutator and an apparatus that is attached to the motor and obtains information on rotation of the motor. The apparatus includes a rotation angle calculator that calculates a rotation angle of the motor based on a voltage between terminals of the motor and an electric current flowing through the motor, a first signal generator that generates a first signal based on a ripple component included in the electric current flowing through the motor, a second signal generator that generates a second signal indicating that the motor has rotated by a predetermined angle based on the first signal and the rotation angle, and a rotation information calculator that calculates the information on the rotation of the motor based on an output from the second signal generator. The second signal generator outputs a command to correct the rotation angle to a first value to the rotation angle calculator if the rotation angle is within a predetermined range when the first signal is received.

DESCRIPTION OF THE PREFERRED EMBODIMENTS

An aspect of this disclosure makes it possible to provide an apparatus that can obtain highly-reliable information on the rotation of a DC commutator motor.

Embodiments of the present invention are described below with reference to the accompanying drawings.

Figure 1:
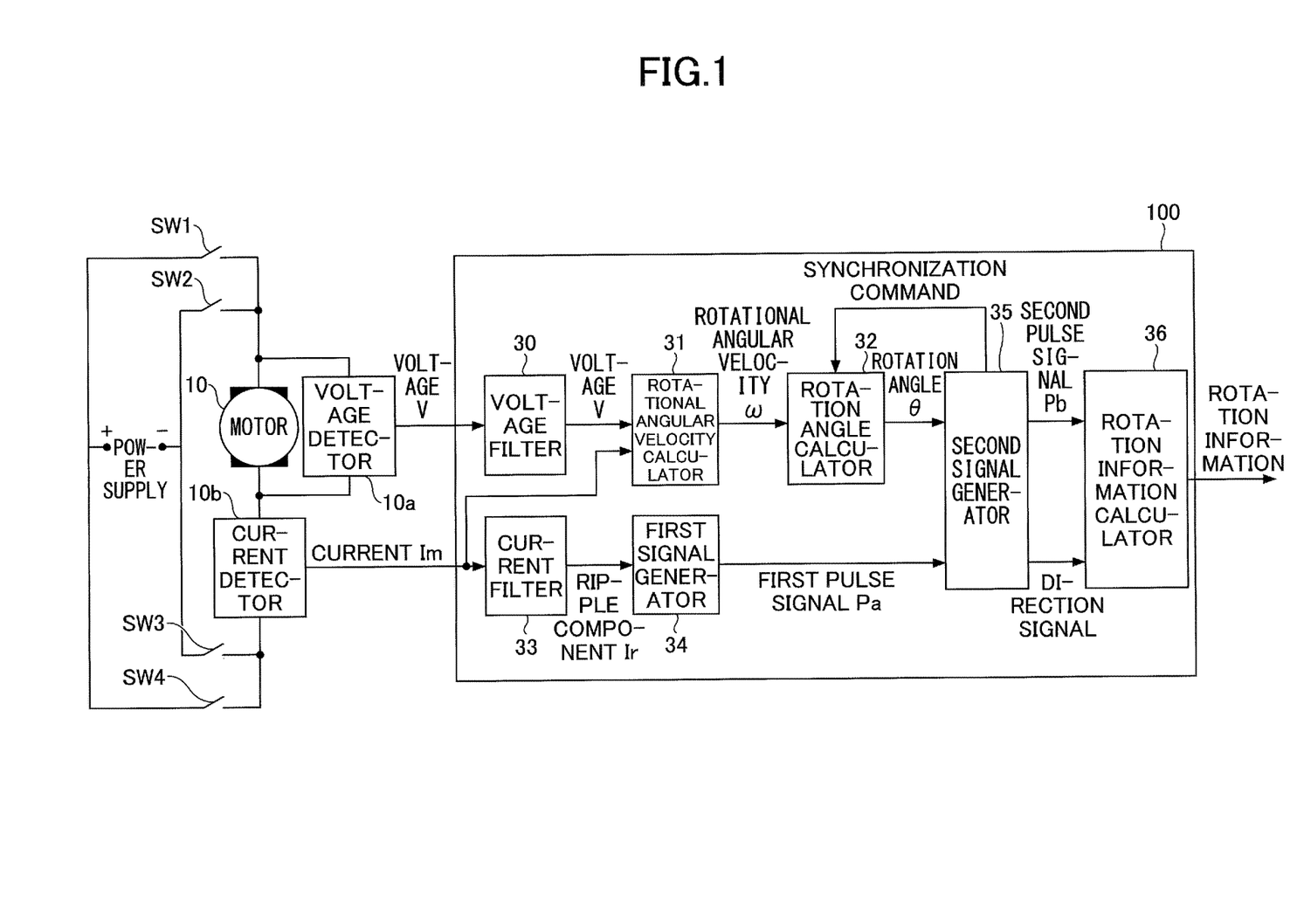
FIG. 1 is a drawing illustrating an example of a configuration of an apparatus according to an embodiment of the present invention.

An apparatus 100 according to an embodiment of the present invention is described below with reference to the accompanying drawings. FIG. 1 is a drawing illustrating an example of a configuration of the apparatus 100 according to the embodiment of the present invention.

The apparatus 100 obtains information (which is hereafter referred as "rotation information") on the rotation of a motor 10. In the example of FIG. 1, the apparatus 100 obtains rotation information on the motor 10 based on a voltage V between terminals of the motor 10 and a current Im flowing through the motor 10. For example, the apparatus 100 may be configured to control the rotational position of the rotation shaft of the motor 10 based on the rotation information without using a rotation sensor such as a hall sensor. The apparatus 100 may be attached to the motor 10, and the apparatus 100 and the motor 10 may be collectively referred to as a motor module.

The motor 10 is, for example, a direct current (DC) commutator motor including a commutator. The motor 10 is used, for example, to move a vehicle window up and down, to adjust the angle of a door mirror, to adjust the amount of air output from an air conditioner, and to adjust the optical axis of a headlight.

Figure 2:
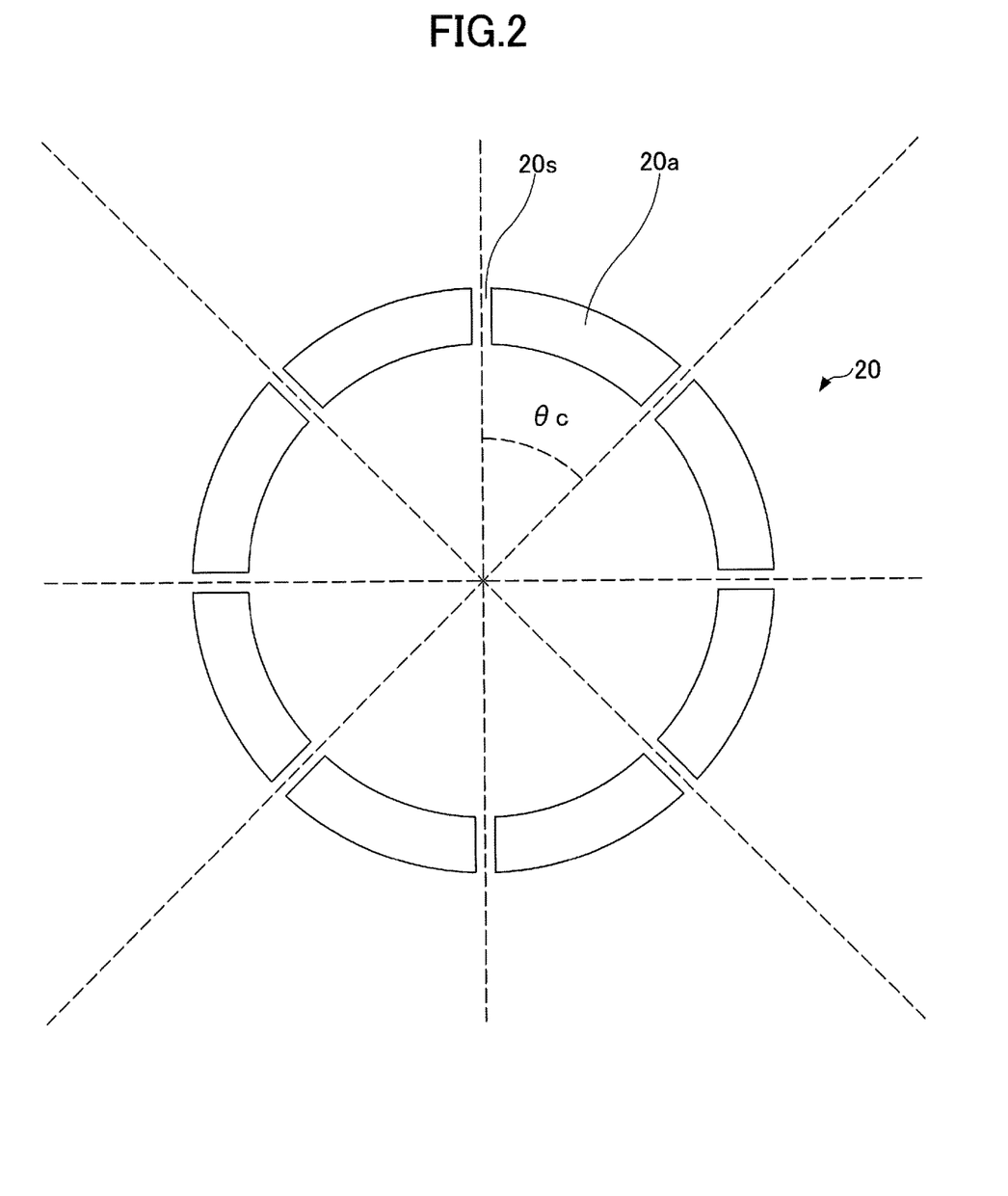
FIG. 2 is a drawing illustrating a commutator.

FIG. 2 is a drawing illustrating an example of a commutator 20. As illustrated in FIG. 2, the commutator 20 includes eight commutator segments 20a that are separated from each other by slits 20s. An inter-slit angle θc, which is the central angle of an arc formed by each commutator segment 20a, is about 45 degrees.

In the example of FIG. 1, the motor 10 is connected to a power supply via four switches SW1 through SW4. The motor 10 rotates clockwise or forward when the switch SW1 and the switch SW3 are closed (turned on), and rotates counterclockwise or backward when the switch SW2 and the switch SW4 are closed (turned on). In the example of FIG. 1 where the motor 10 is connected to the power supply, an electric current flowing through the motor 10 rotating forward indicates a positive value, and an electric current flowing through the motor 10 rotating backward indicates a negative value. While the motor 10 is rotating by inertia, the switch SW2 and the switch SW3 are closed (turned on), an electric current flowing through the motor 10 rotating forward indicates a negative value, and an electric current flowing through the motor 10 rotating backward indicates a positive value.

A voltage detector 10a is configured to detect the voltage V between the terminals of the motor 10. A current detector 10b is configured to detect the current Im flowing through the motor 10.

The apparatus 100 mainly includes a voltage filter 30, a rotational angular velocity calculator 31, a rotation angle calculator 32, a current filter 33, a first signal generator 34, a second signal generator 35, and a rotation information calculator 36. These functional components may be implemented by electric circuits or by software.

The voltage filter 30 is a functional component that is configured to adjust the voltage V output from the voltage detector 10a. For example, the voltage filter 30 adjusts the voltage V such that the rotational angular velocity calculator 31 can properly calculate the rotational angular velocity of the motor 10. In the example of FIG. 1, the voltage filter 30 is a low-pass filter that is configured to remove, as noise, a high-frequency component in the waveform of the voltage V output from the voltage detector 10a.

The rotational angular velocity calculator 31 is a functional component that is configured to calculate the rotational angular velocity of the motor 10 based on the voltage V between the terminals of the motor 10 and the current Im flowing through the motor 10. In the example of FIG. 1, the rotational angular velocity calculator 31 calculates a rotational angular velocity ω according to formula (1) below.

[Formula 1]

$$\omega = \frac{1}{Ke} \times \left( V - Im \times Rm - Lm \times \frac{dIm}{dt} \right) \quad (1)$$

In formula (1), Ke indicates a counter electromotive voltage, Rm indicates an internal resistance of the motor 10, Lm indicates an inductance of the motor 10, and dIm/dt indicates a one-time differential of the current Im. The one-time differential of the current Im is, for example, a difference between the previous value of the current Im and the current value of the current Im.

For example, the rotational angular velocity calculator 31 may be configured to calculate the rotational angular velocity ω of the motor 10 at each predetermined control period, and output the calculated rotational angular velocity ω to the rotation angle calculator 32.

The rotation angle calculator 32 is a functional component that is configured to calculate a rotation angle θ of the motor 10. In the example of FIG. 1, the rotation angle calculator 32 calculates the rotation angle θ according to formula (2) below.

[Formula 2]

$$\theta = \int_0^t \omega \times dt \quad (2)$$

For example, the rotation angle calculator 32 may be configured to calculate the rotation angle θ by integrating the rotational angular velocities ω output by the rotational angular velocity calculator 31 at predetermined control periods, and output the calculated rotation angle θ to the second signal generator 35.

Also, the rotation angle calculator 32 may be configured to reset the rotation angle θ to zero in response to a synchronization command from the second signal generator 35.

The current filter 33 is a functional component that is configured to adjust the current Im output from the current detector 10b. For example, the current filter 33 adjusts the current Im such that the first signal generator 34 can properly detect the ripple component Ir of the current Im. In the example of FIG. 1, the current filter 33 is a band-pass filter that is configured to remove components other than the ripple component Ir from the waveform of the current Im output from the current detector 10b. The ripple component Ir is a periodic component included in the current Im and is generated mainly when the commutator segments 20a contact and separate from the brush. Therefore, typically, an angle that the motor 10 rotates during one period of the ripple component Ir equals the inter-slit angle θc.

The first signal generator 34 is a functional component that is configured to generate a signal indicating that the motor 10 has rotated by a predetermined angle. For example, the first signal generator 34 generates ripple detection signals (first pulse signals Pa) based on the waveform of the ripple component Ir output from the current filter 33.

Figure 3:
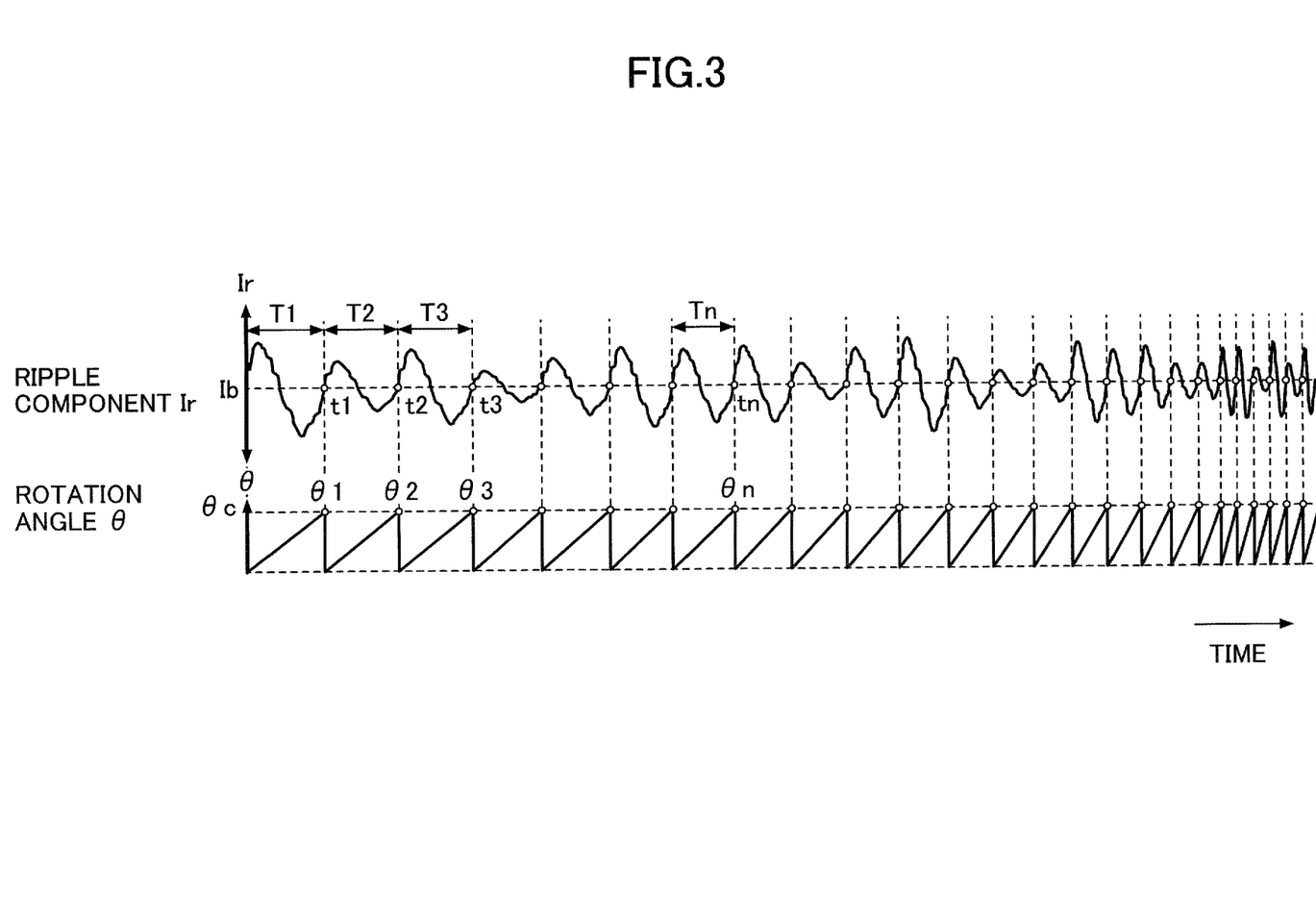
FIG. 3 is a timing chart illustrating timings at which a first signal generator generates first pulse signals.

FIG. 3 is a timing chart illustrating timings at which the first signal generator 34 generates the first pulse signals Pa. For example, the first signal generator 34 generates a first pulse signal Pa each time the ripple component Ir exceeds a reference current value Ib. In the example of FIG. 3, the first signal generator 34 generates first pulse signals Pa at times t1, t2, t3, . . . , and tn. T1, T2, T3, . . . , and Tn indicate periods of the ripple component; and θ1, θ2, θ3, . . . , and θn indicate the rotation angles θ at the times when the first signal generator 34 generates the first pulse signals. The rotation angles θ are calculated by the rotation angle calculator 32. Thus, typically, the first signal generator 34 generates the first pulse signal Pa each time the rotation angle θ becomes substantially the same as a predetermined angle (e.g., the inter-slit angle θc).

Here, when, for example, the current Im and its ripple component Ir become small in an inertial rotation period after the motor 10 is powered off, the first signal generator 34 may not be able to generate the first pulse signal Pa based on the waveform of the ripple component Ir. Also, when, for example, a rush current is generated immediately after the motor 10 is powered on, the first signal generator 34 may erroneously generate the first pulse signal Pa according to the rush current. Such a generation failure and erroneous generation of the first pulse signal Pa may reduce the reliability of rotation information of the motor 10 output by the apparatus 100.

For the above reason, the apparatus 100 includes the second signal generator 35 that can more accurately generate a signal indicating that the motor 10 has rotated by a predetermined angle.

The second signal generator 35 is a functional component that is configured to generate a signal indicating that the motor 10 has rotated by a predetermined angle. The second signal generator 35 may be configured to generate pseudo-ripple signals (second pulse signals Pb) based on rotation angles θ output from the rotation angle calculator 32 and first pulse signals Pa output from the first signal generator 34.

Figure 4:
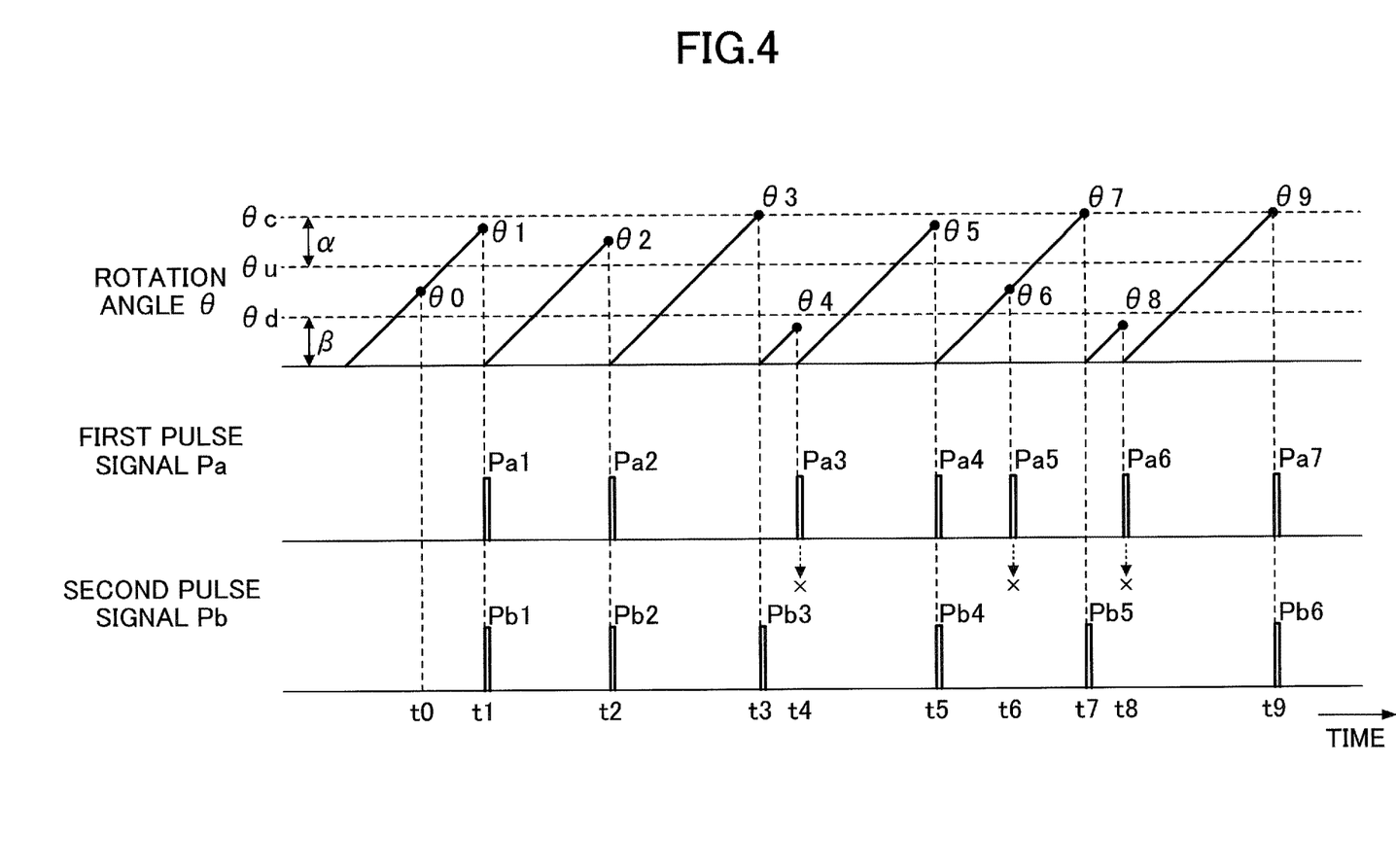
FIG. 4 is a timing chart illustrating timings at which a second signal generator generates second pulse signals.

FIG. 4 is a timing chart illustrating timings at which the second signal generator 35 generates the second pulse signals Pb.

For example, the second signal generator 35 generates a second pulse signal Pb when the rotation angle θ reaches a predetermined angle. The predetermined angle is, for example, the inter-slit angle θc. In the example of FIG. 4, the second signal generator 35 generates second pulse signals Pb3, Pb5, and Pb6 when the absolute values of rotation angles θ3, θ7, and θ9 reach the inter-slit angle θc at times t3, t7, and t9. After generating the second pulse signals Pb, the second signal generator 35 outputs a synchronization command to the rotation angle calculator 32. When receiving the synchronization command, the rotation angle calculator 32 resets the rotation angle θ to zero.

That is, the second signal generator 35, for example, generates the second pulse signal Pb3 if the absolute value of the rotation angle θ3 reaches the inter-slit angle θc after generating the second pulse signal Pb2 at a time t2 and before receiving the first pulse signal Pa.

Thus, the second signal generator 35 generates the second pulse signal Pb as long as the absolute value of the rotation angle θ calculated by the rotation angle calculator 32 reaches the inter-slit angle θc even if the first pulse signal Pa is not generated for some reason. This configuration makes it possible to reliably prevent the generation failure of the first pulse signal Pa.

Also, the second signal generator 35 generates the second pulse signal Pb if the rotation angle θ received when the first pulse signal Pa is generated by the first signal generator 34 is greater than or equal to a first threshold θu and less than the inter-slit angle θc. The first threshold θu may be set in advance or may be set dynamically. In the example of FIG. 4, rotation angles θ1, θ2, and θ5 received when the first pulse signals Pa1, Pa2, and Pa4 are generated by the first signal generator 34 are greater than or equal to the first threshold θu and less than the inter-slit angle θc. That is, the remaining angle necessary for each of the rotation angles θ1, θ2, and θ5 to reach the inter-slit angle θc is less than an angle α. In this case, the second signal generator 35 can determine that the first pulse signals Pa1, Pa2, and Pa5 generated by the first signal generator 34 at times t1, t2, and t5 are not noise. Accordingly, the second signal generator 35 generates second pulse signals Pb1, Pb2, and Pb4 at times t1, t2, and t5. After generating the second pulse signals Pb, the second signal generator 35 outputs a synchronization command to the rotation angle calculator 32.

On the other hand, the second signal generator 35 does not generate the second pulse signal Pb if the rotation angle θ received when the first pulse signal Pa is generated by the first signal generator 34 is less than a second threshold θd. The second threshold θd may be set in advance or may be set dynamically. Typically, the above situation occurs after the rotation angle θ reaches the predetermined angle and the second pulse signal Pb is generated. In the example of FIG. 4, the first signal generator 34 generates the first pulse signal Pa3 at a time t4 that is after the absolute value of the rotation angle θ3 reaches the inter-slit angle θc at the time t3 and the second pulse signal Pb3 is generated. At the time t4, a rotation angle θ4 is less than the second threshold θd. That is, the rotation angle θ4 calculated after the rotation angle θ is reset at the time t3 is still less than an angle β. In this case, the second signal generator 35 can determine that the first pulse signal Pa3 generated by the first signal generator 34 at the time t4 can be integrated with the second pulse signal Pb3 generated at the time t3. This is described in more detail. The second signal generator 35 was expected to generate the second pulse signal Pb3 when the first pulse signal Pa3 was generated. However, because the absolute value of the rotation angle θ reached the inter-slit angle θc before the first pulse signal Pa3 was generated, the second signal generator 35 generated the second pulse signal Pb3 before the first pulse signal Pa3 was generated to reliably prevent the pulse signal generation failure. Accordingly, the second signal generator 35 can consider the first pulse signal Pa3 generated immediately after the second pulse signal Pb3 is generated as a first pulse signal Pa that would have been generated at the same time as the second pulse signal Pb3. In this case, the second signal generator 35 does not generate the second pulse signal Pb at the time t4, but outputs a synchronization, command to the rotation angle calculator 32. In FIG. 4, a dotted arrow directed to "X" indicates that no second pulse signal Pb is generated based on the first pulse signal Pa3. Other dotted arrows directed to "X" also indicate that no second pulse signal Pb is generated.

Also, if the rotation angle θ received when the first pulse signal Pa is generated by the first signal generator 34 is greater than or equal to the second threshold θd and less than the first threshold θu, the second signal generator 35 neither generates the second pulse signal Pb nor outputs the synchronization signal to the rotation angle calculator 32. In the example of FIG. 4, a rotation angle θ6 received when a first pulse signal Pa5 is generated by the first signal generator 34 at a time t6 is greater than or equal to the second threshold θd and less than the first threshold θu. That is, the remaining angle necessary for the rotation angle θ6 to reach the inter-slit angle θc is greater than the angle α, and the rotation angle θ6 calculated after the rotation angle θ is reset at the time t5 is greater than or equal to the angle β. In this case, the second signal generator 35 can determine that the first pulse signal Pa5 is based on noise. Accordingly, at the time t6, the second signal generator 35 neither generates the second pulse signal Pb nor outputs the synchronization command to the rotation angle calculator 32. This configuration makes it possible to completely eliminate the influence of the first pulse signal Pa5 that is based on noise.

With the above configuration, for example, the second signal generator 35 can generate the second pulse signal Pb even when the current Im and its ripple component Ir become small in an inertial rotation period after the motor 10 is powered off and the first signal generator 34 cannot generate the first pulse signal Pa based on the waveform of the ripple component Ir.

Also, when, for example, a rush current is generated immediately after the motor 10 is powered on and the first signal generator 34 erroneously generates the first pulse signal Pa according to the rush current, the second signal generator 35 does not generate the second pulse signal Pb corresponding to the first pulse signal Pa. This configuration makes it possible to completely eliminate the influence of the erroneously-generated first pulse signal Pa.

The apparatus 100 calculates rotation information of the motor 10 based on the second pulse signals Pb instead of the first pulse signals Pa. This configuration makes it possible to improve the reliability of the rotation information.

The second signal generator 35 is also configured to output a direction signal indicating the rotation direction of the motor 10. For example, the second signal generator 35 outputs a signal indicating a forward rotation direction when the rotation angle θ is a positive value and outputs a signal indicating a backward rotation direction when the rotation angle θ is a negative value. The rotation angle θ takes a positive value when the electric current flowing through the motor 10 is positive and takes a negative value when the electric current flowing through the motor 10 is negative. However, during inertial rotation, the rotation angle θ takes a positive value when the electric current flowing through the motor 10 is negative and takes a negative value when the electric current flowing through the motor 10 is positive.

The rotation information calculator 36 is a functional component that is configured to calculate rotation information of the motor 10. The rotation information of the motor 10 includes, for example, a rotation amount (rotation angle) from a reference rotation position and the number of rotations from the reference rotation position. When the motor 10 is used to move a vehicle window up and down, the rotation information of the motor 10 may include a relative position of the upper edge of the window relative to a reference position and an opening amount of the window. The rotation information may also include statistics such as an average, the largest value, the smallest value, and a mean value of the rotational angular velocity ω during a given period. In the example of FIG. 1, the rotation information calculator 36 calculates rotation information of the motor 10 based on outputs from the second signal generator 35. For example, the rotation amount after the motor 10 starts rotating can be calculated by multiplying the number of the second pulse signals Pb generated after the motor 10 starts rotating by the inter-slit angle θc. In this process, the rotation information calculator 36 determines whether to increment or decrement the number of the second pulse signals Pb based on direction signals output from the second signal generator 35 together with the second pulse signals Pb. Alternatively, the rotation information calculator 36 may be configured to separately count the number of second pulse signals Pb received together with direction signals indicating the forward rotation direction and the number of second pulse signals Pb received together with direction signals indicating the backward rotation direction, and to calculate the rotation amount of the motor 10 based the difference between the counted numbers.

Figure 5:
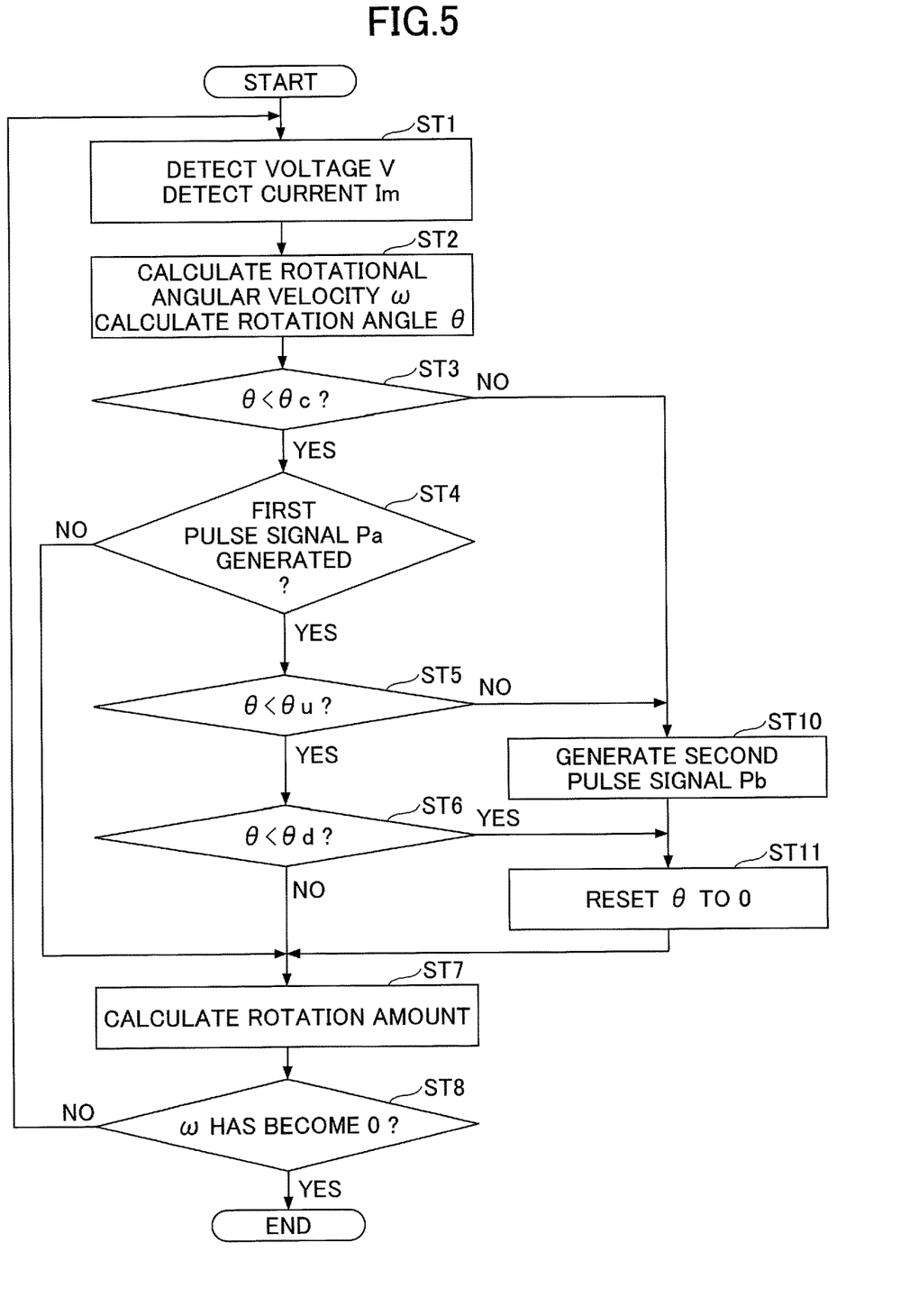
FIG. 5 is a flowchart illustrating a rotation-amount calculation process.

Next, a process (which is hereafter referred to as a "rotation-amount calculation process") performed by the apparatus 100 to calculate a rotation amount of the motor 10 is described with reference to FIG. 5. FIG. 5 is a flowchart illustrating the rotation-amount calculation process. For example, the apparatus 100 performs the rotation-amount calculation process while the motor 10 is being driven.

First, the apparatus 100 obtains the voltage V and the current Im (step ST1). In the example of FIG. 1, the apparatus 100 obtains the voltage V output from the voltage detector 10a and the current Im output from the current detector 10b at each predetermined control period.

Next, the apparatus 100 calculates the rotational angular velocity ω and the rotation angle θ (step ST2). In the example of FIG. 1, the rotational angular velocity calculator 31 of the apparatus 100 calculates the rotational angular velocity ω at each predetermined control period by inserting the voltage V and the current Im in formula (1). Then, the rotation angle calculator 32 of the apparatus 100 calculates the rotation angle θ by integrating rotational angular velocities ω calculated at the respective control periods.

Next, the apparatus 100 determines whether the rotation angle θ is less than a predetermined angle (step ST3). In the example of FIG. 1, the second signal generator 35 of the apparatus 100 determines whether the rotation angle θ is less than the inter-slit angle θc.

When determining that the rotation angle θ is greater than or equal to the inter-slit angle θc (NO at step ST3), the second signal generator 35 determines that the first pulse signal Pa has not been generated at expected timing. Then, the second signal generator 35 generates the second pulse signal Pb (step ST10), and resets the rotation angle θ (step ST11). This is a case where the rotation angle θ reaches the inter-slit angle θc before the first pulse signal Pa is generated, and corresponds to each of cases in the example of FIG. 4 where the absolute value of the rotation angle θ reaches the rotation angles θ3, θ7, and θ9 at the times t3, t7, and t9, respectively.

On the other hand, when determining that the rotation angle θ is less than the inter-slit angle θc (YES at step ST3), the second signal generator 35 determines whether the first pulse signal Pa has been generated (step ST4). In the example of FIG. 1, the second signal generator 35 determines whether the first pulse signal Pa has been generated by the first signal generator 34.

When determining that the rotation angle θ is less than the inter-slit angle θc and the first pulse signal Pa has not been generated (NO at step ST4), the second signal generator 35 neither generates the second pulse signal Pb nor resets the rotation angle θ. Then, the rotation information calculator 36 calculates a rotation amount of the motor 10 based on outputs from the second signal generator 35. In this case, there is no change in the calculated rotation amount. This corresponds to a case in the example of FIG. 4 where the rotation angle θ is the rotation angle θ0 at a time t0.

When determining that the first pulse signal Pa has been generated (YES at step ST4), the second signal generator 35 determines whether the rotation angle θ is less than the first threshold θu (step ST5).

This is to determine whether the first pulse signal Pa generated earlier than the expected timing is based on noise.

When determining that the rotation angle θ is greater than or equal to the first threshold θu (NO at step ST5), the second signal generator 35 performs a process that is substantially the same as a process performed when the first pulse signal Pa is generated at expected timing. That is, the second signal generator 35 generates the second pulse signal Pb (step ST10), and resets the rotation angle θ (step ST11). This is because it can be determined that the first pulse signal Pa generated earlier than the desired timing is not based on noise. This corresponds to cases in the example of FIG. 4 where the first pulse signals Pa1, Pa2, and Pa4 are generated at the times t1, t2, and t5.

When the rotation angle θ is less than the first threshold θu (YES at step ST5), the second signal generator 35 cannot determine that the first pulse signal Pa is not based on noise. This is because there is a possibility that the first pulse signal Pa is generated later than the expected timing instead of being generated earlier than the expected timing. For this reason, the second signal generator 35 determines whether the rotation angle θ is less than the second threshold θd (step ST6). This is to determine whether the first pulse signal Pa generated later than the expected timing is based on noise.

When determining that the rotation angle θ is less than the second threshold θd (YES at step ST6), the second signal generator 35 resets the rotation angle θ to zero without generating the second pulse signal Pb (step ST11). This is because it can be determined that the first pulse signal Pa generated later than the expected timing is not based on noise. In other words, it can be determined that the first pulse signal Pa generated later than the expected timing corresponds to the second pulse signal Pb generated immediately before the generation of the first pulse signal Pa. This corresponds to cases in the example of FIG. 4 where the first pulse signals Pa3 and Pa6 are generated at the times t4 and t8. That is, the second signal generator 35 can determine that the first pulse signals Pa3 and Pa6 correspond to the second pulse signals Pb3 and Pb5.

When determining that the rotation angle θ is greater than or equal to the second threshold θd (NO at step ST6), the second signal generator 35 determines that the first pulse signal Pa is based on noise. In this case, the second signal generator 35 neither generates the second pulse signal Pb nor resets the rotation angle θ. Then, the rotation information calculator 36 calculates the rotation amount of the motor 10 based on outputs from the second signal generator 35 not generating the second pulse signal Pb. This corresponds to a case in the example of FIG. 4 where the first pulse signal Pa5 is generated at the time t6. That is, the second signal generator 35 determines that the first pulse signal Pa5 is based on noise.

Next, the apparatus 100 calculates the rotation amount of the motor 10 (step ST7). In the example of FIG. 1, the rotation information calculator 36 of the apparatus 100 calculates the rotation amount after the motor 10 starts rotating by multiplying the number of the second pulse signals Pb generated after the motor 10 starts rotating by the inter-slit angle θc. Then, the apparatus 100 determines whether the rotational angular velocity ω has become zero (step ST8). When determining that the rotational angular velocity ω has not become zero (NO at step ST8), the apparatus 100 repeats steps ST1 through ST7. When determining that the rotational angular velocity ω has become zero (YES at step ST8), the apparatus 100 ends the rotation-amount calculation process.

Figure 6:
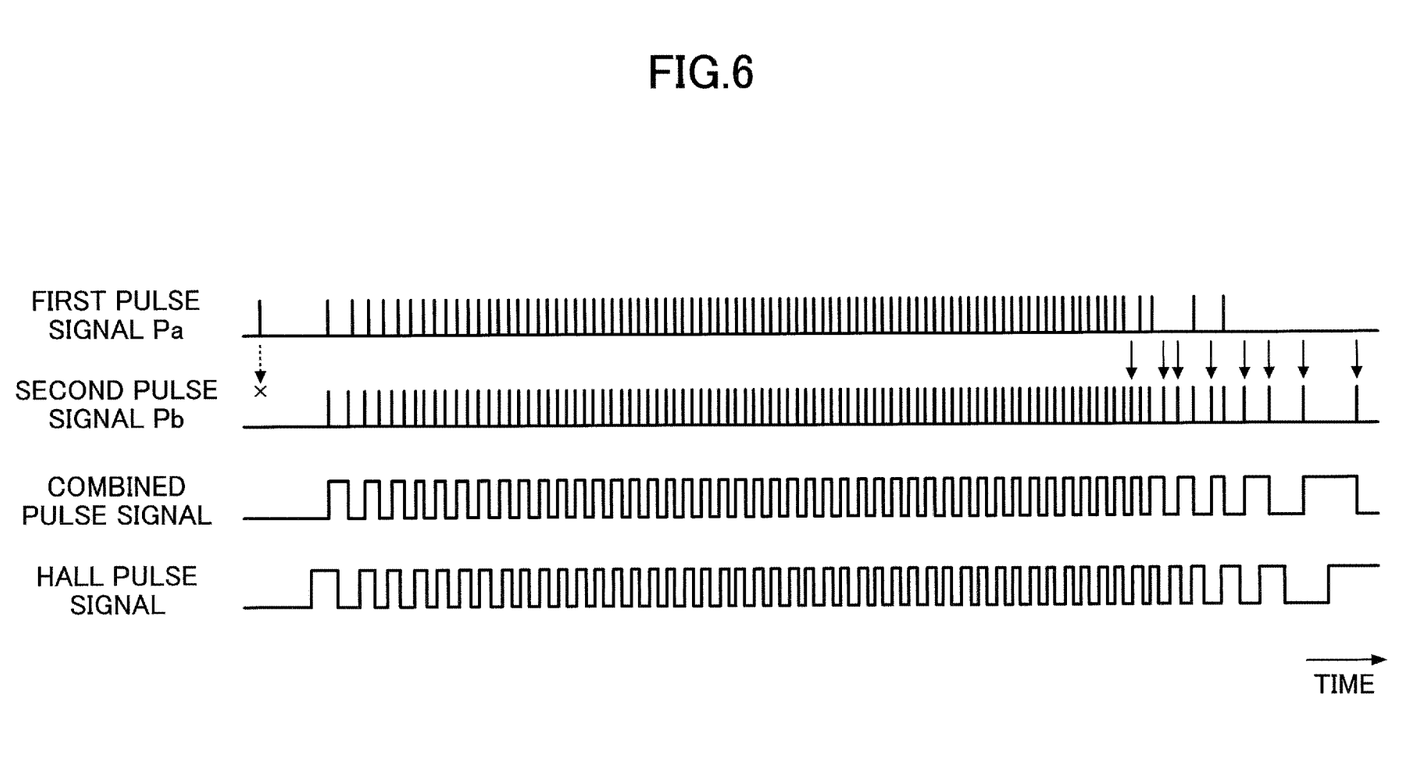
FIG. 6 is a drawing illustrating transitions of a combined pulse signal and a hall pulse signal.

Next, the results of an experiment regarding the reliability of the rotation amounts of the motor 10 calculated by the apparatus 100 are described with reference to FIG. 6. FIG. 6 is a drawing illustrating transitions of a combined pulse signal and a hall pulse signal.

The combined pulse signal is obtained by combining multiple pulses of the second pulse signals Pb into one pulse. In the example of FIG. 6, the inter-slit angle θc is 90 degrees. The first pulse signal Pa and the second pulse signal Pb are basically generated each time the rotation shaft of the motor 10 rotates 90 degrees. The combined pulse signal is obtained by combining two pulses of the second pulse signals Pb into one pulse. That is, the apparatus 100 is configured to generate one combined pulse signal each time the rotation shaft of the motor 10 rotates 180 degrees.

The hall pulse signal is a pulse signal output by a hall sensor. The hall sensor detects a magnetic flux generated by a magnet attached to the rotation shaft of the motor 10 for comparison between the second pulse signal Pb and the hall pulse signal. In the example of FIG. 6, the apparatus 100 is configured to generate one hall pulse signal each time the rotation shaft of the motor 10 rotates 180 degrees.

In FIG. 6, a dotted arrow directed to "X" indicates that no second pulse signal Pb was generated based on the first pulse signal Pa. That is, the dotted arrow indicates that the first pulse signal Pa was ignored as noise. Each of eight solid arrows in FIG. 6 indicates that the second pulse signal Pb was generated when the generation of the first pulse signal Pa failed.

In the example of FIG. 6, the number of combined pulse signals generated during a period after the forward rotation of the motor 10 is started and before the forward rotation is stopped is the same as the number of hall pulse signals generated during the period. That is, the rotation amount of the motor 10 calculated based on the second pulse signals Pb is the same as the rotation amount of the motor 10 detected by the hall sensor.

As described above, the apparatus 100 obtains rotation information of the motor 10 including the commutator 20 and includes the rotation angle calculator 32 that calculates the rotation angle θ based on the voltage V and the current Im, the first signal generator 34 that generates the first pulse signal Pa based on the ripple component Ir included in the current Im, the second signal generator 35 that generates the second pulse signal Pb indicating that the motor 10 has rotated by a predetermined angle based on the first pulse signal Pa and the rotation angle θ, and the rotation information calculator 36 that calculates the rotation information based on outputs from the second signal generator 35. With this configuration, the apparatus 100 can obtain more reliable rotation information of the motor 10, compared with the related-art technology. Rotation sensors such as a hall sensor may be omitted. This indicates that components such as a sensor interface circuit and a harness necessary to use the rotation sensor may be omitted. This in turn makes it possible to reduce the weight, the costs, and the size of the apparatus 100.

The apparatus 100 is preferably configured to generate the second pulse signal Pb based on the first pulse signal Pa generated based on the ripple component Ir of the current Im and the rotation angle θ calculated based on the voltage V and the current Im. That is, the apparatus 100 is configured to calculate the second pulse signal Pb based on the first pulse signal Pa and the rotation angle θ that are two parameters obtained by different methods. With this configuration, even when a first parameter of the parameters is not obtained properly, the apparatus 100 can compensate for the first parameter by using a second parameter of the parameters. Accordingly, the apparatus 100 can obtain more reliable rotation information of the motor 10.

The rotation angle calculator 32 is configured, for example, to calculate the rotation angle θ by integrating the rotational angular velocities ω of the motor 10 calculated based on the voltage V and the current Im. With this configuration, the rotation angle calculator 32 can stably and continuously calculate the rotation angle θ throughout the entire period including a period immediately after the motor 10 is started and an inertial rotation period. Also, the second signal generator 35 is configured to generate the second pulse signal Pb immediately when the rotation angle θ reaches a predetermined angle. Thus, the second signal generator 35 can generate, in real time, the second pulse signal Pb indicating that the motor 10 has rotated by a predetermined angle based on the stably and continuously calculated rotation angle θ even if there is a failure in generating the first pulse signal Pa. With this configuration, the apparatus 100 can calculate rotation information of the motor 10 without delay.

The second signal generator 35 is configured to output, to the rotation angle calculator 32, a command to reset the rotation angle θ to zero when, for example, the rotation angle θ reaches a predetermined angle. With this configuration, the apparatus 100 can prevent the largest value of the cumulative error of the rotation angle θ calculated by the rotation angle calculator 32 from exceeding the predetermined angle.

The predetermined angle is, for example, the central angle of an arc formed by the commutator segment 20a, i.e., the inter-slit angle θc. With this configuration, the apparatus 100 can set the inter-slit angle θc as the largest value of the cumulative error of the rotation angle θ calculated by the rotation angle calculator 32.

The second signal generator 35 is configured to generate the second pulse signal Pb if the rotation angle θ is greater than or equal to the first threshold θu when the first pulse signal Pa is received. For example, the first threshold θu is set in advance at a value smaller than the predetermined angle (the inter-slit angle θc). With this configuration, the second signal generator 35 can determine that the first pulse signal Pa generated earlier than the expected timing is not based on noise. This configuration makes it possible to generate the second pulse signal Pb prior to the generation failure of the first pulse signal Pa. This in turn makes it possible to quickly and reliably prevent the calculation of rotation information from being influenced by the generation failure of the first pulse signal Pa.

Also, the second signal generator 35 is configured to not generate the second pulse signal Pb if the rotation angle θ is less than the first threshold θu when the first pulse signal Pa is received. With this configuration, the second signal generator 35 can determine that the first pulse signal Pa generated at timing different from the expected timing is based on noise. This makes it possible to prevent generation of a second pulse signal Pb corresponding to a first pulse signal Pa generated based on noise. This in turn makes it possible to quickly and reliably prevent the calculation of rotation information from being influenced by the first pulse signal Pa generated based on noise.

Also, the second signal generator 35 is configured to output, to the rotation angle calculator 32, a command to reset the rotation angle θ to zero if the rotation angle θ is less than the second threshold θd when the first pulse signal Pa is received. For example, the second threshold θd is set in advance at a value smaller than the first threshold θu. With this configuration, the second signal generator 35 can determine that the first pulse signal Pa is not based on noise if the first pulse signal Pa is received immediately after generating the second pulse signal Pb prior to a generation failure of the first pulse signal Pa. This configuration makes it possible to associate the first pulse signal Pa with the second pulse signal Pb generated immediately before the first pulse signal Pa is received. This in turn makes it possible to quickly and reliably prevent the calculation of rotation information from being influenced by the generation timing error of the first pulse signal Pa.

Figure 7:
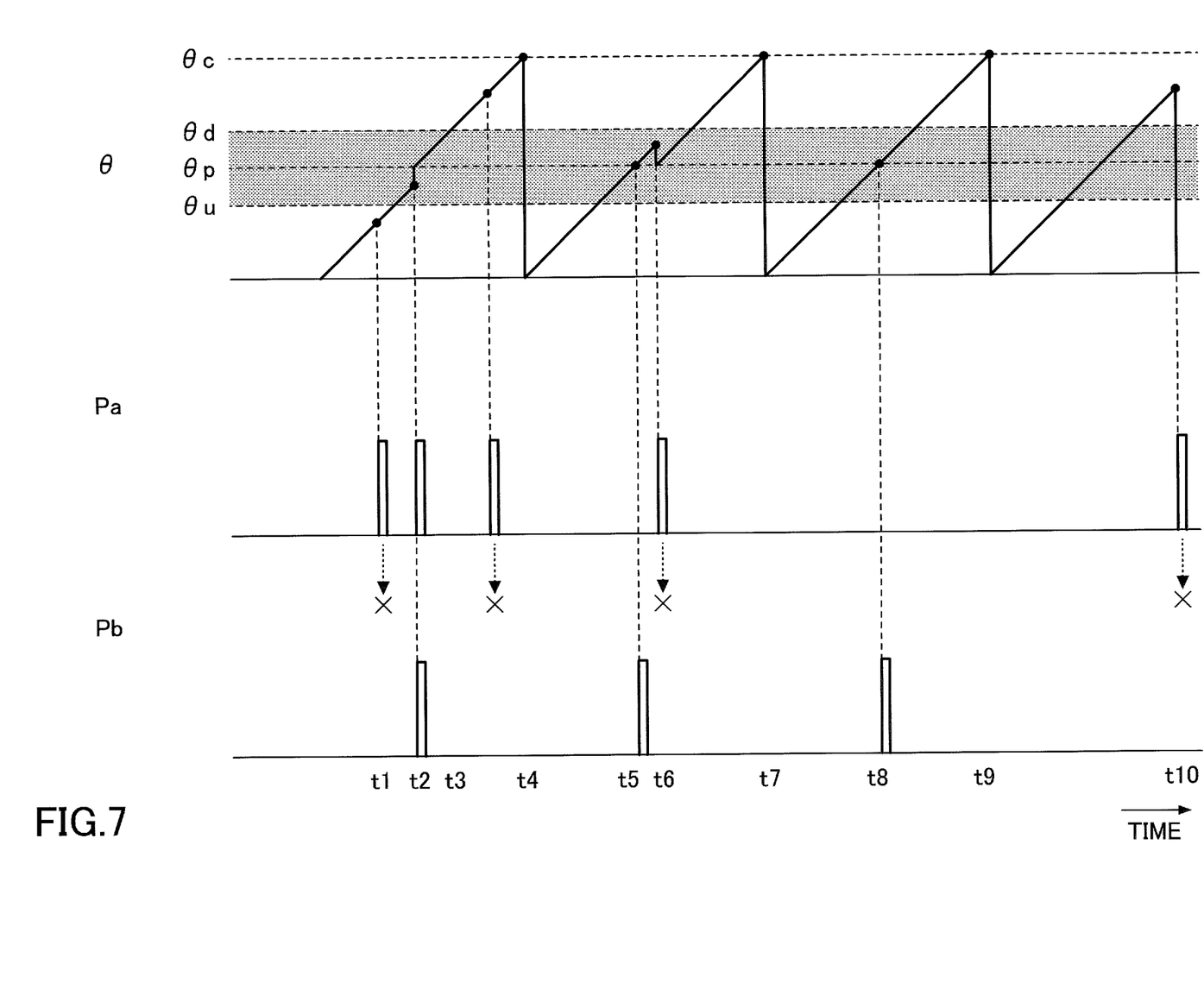
FIG. 7 is another timing chart illustrating timings at which a second signal generator generates second pulse signals.
Figure 8:
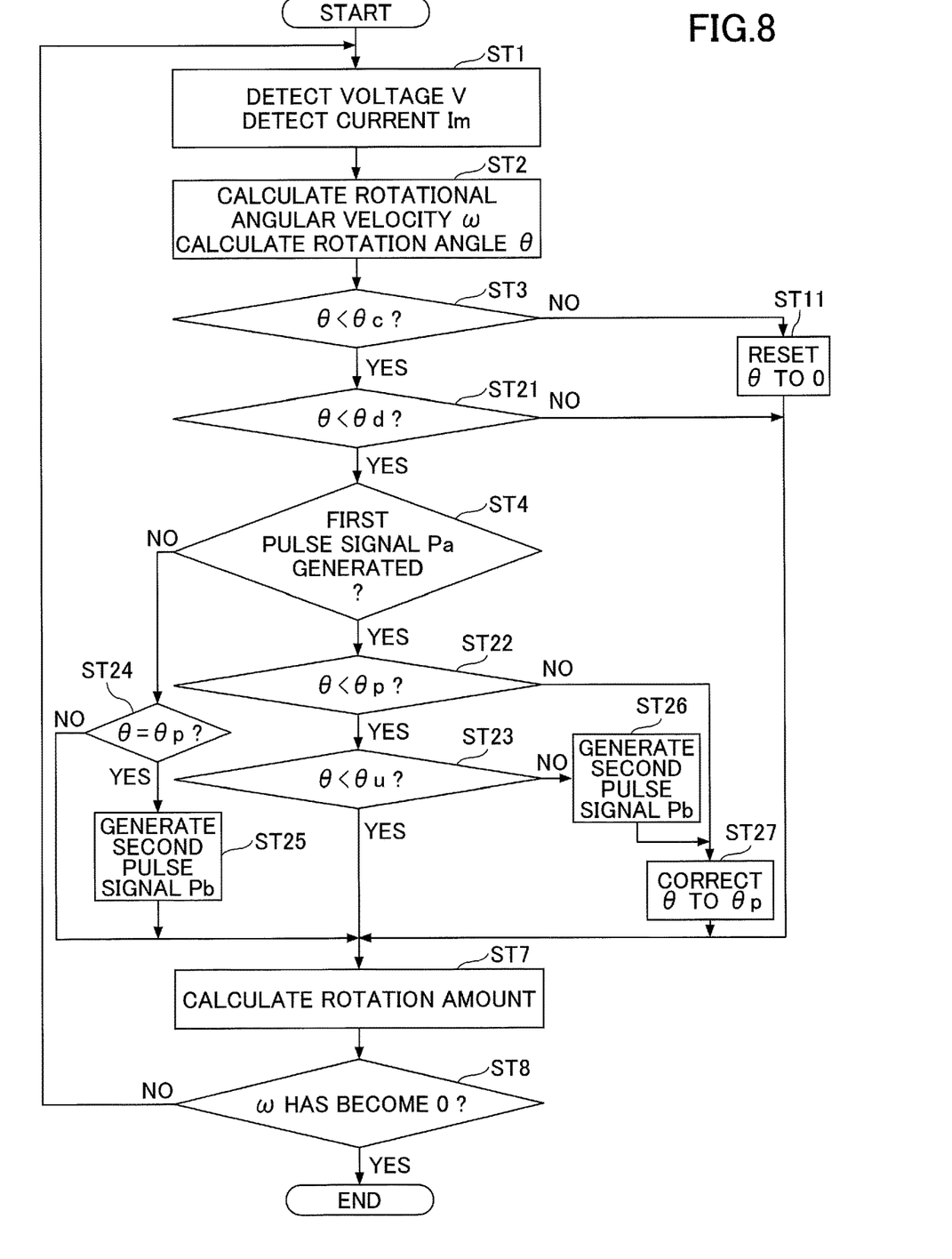
FIG. 8 is a flowchart illustrating another example of a rotation-amount calculation process.

FIGS. 7 and 8 illustrate another embodiment of the present invention.

FIGS. 4 and 7 differ from each other in the order of the thresholds and the predetermined angle. In the embodiment of FIG. 7, the thresholds and the predetermined angle are in the following order:

0<first threshold θu<first value θp<second threshold θd<predetermined angle θc.

FIG. 8 is a flowchart illustrating a rotation-amount calculation process corresponding to the timing chart of FIG. 7.

The same reference numbers as those assigned to steps in the flowchart of FIG. 5 are assigned to the corresponding steps in the flowchart of FIG. 8. Some steps in the flowchart of FIG. 8 are the same as the corresponding steps in the flowchart of FIG. 5, and descriptions of those steps are omitted here.

Steps ST1 through ST3 in FIG. 8 are the same as the corresponding steps in FIG. 5. At step ST3, the second signal generator 35 determines whether the rotation angle θ is less than the predetermined angle.

When determining that the rotation angle θ is less than the inter-slit angle θc (YES at step ST3), the second signal generator 35 determines whether the rotation angle θ is less than the second threshold θd (step ST21). When the rotation angle θ is greater than or equal to the second threshold θd, the apparatus 100 calculates the rotation amount (step ST7).

On the other hand, when determining that the rotation angle θ is less than the second threshold θd (YES at step ST21), the second signal generator 35 determines whether the first pulse signal Pa has been generated (step ST4).

When determining that the rotation angle θ is less than the inter-slit angle θc and the first pulse signal Pa has not been generated (NO at step ST4), the second signal generator 35 further determines whether the rotation angle θ is equal to the first value θp (step ST24). When the rotation angle θ is equal to the first value θp (YES at step ST24), the second signal generator 35 generates the second pulse signal Pb (step ST25). Here, when the rotation speed is slow, the amplitude of the ripple component Ir may become small and the first pulse signal Pa may not be generated. In the present embodiment, the second pulse signal Pb is generated if the first pulse signal Pa is not generated before the rotation angle θ reaches the first value θp. This configuration makes it possible to generate the second pulse signal Pb even if the first pulse signal Pa is not generated. Also, as described later, when the first pulse signal Pa is generated while the rotation angle θ is greater than or equal to the first value θp and less than the second threshold θd, the rotation angle θ is corrected to the first value θp without generating the second pulse signal Pb. With this configuration, the second pulse signal Pb is generated only once in each period. When the first pulse signal Pa is generated while the rotation angle θ is greater than or equal to the first value θp and less than the second threshold θd, the second pulse signal Pb is generated earlier than the actual rotation of the motor 10. With this configuration, however, errors are not accumulated. On the other hand, with the related-art method, errors are accumulated. For this reason, when the motor rotates many times, the method of the present embodiment can make the error smaller compared with the related-art method.

After generating the second pulse signal Pb (ST25), the second signal generator 35 calculates the rotation amount (ST7). On the other hand, when the rotation angle θ is not equal to the first value θp (NO at step ST24), the rotation information calculator 36 calculates the rotation amount of the motor 10 based on an output from the second signal generator 35 (step ST7).

When determining that the first pulse signal Pa has been generated (YES at step ST4), the second signal generator 35 determines whether the rotation angle θ is less than the first value θp (step ST22). When the rotation angle θ is greater than or equal to the first value θp (NO at step ST22), the second signal generator 35 corrects the rotation angle θ to the first value θp (step ST27). After the rotation angle θ is corrected to the first value θp (step ST27), the rotation information calculator 36 calculates the rotation amount (step ST7). Here, when the rotation angle θ is greater than or equal to the first value θp, the second pulse signal Pb has already been generated (ST25 or ST26), and therefore the second signal generator 35 does not generate the second pulse signal Pb.

When determining that the rotation angle θ is less than the first value θp (YES at step ST22), the second signal generator 35 determines whether the rotation angle θ is less than the first threshold θu (step ST23). When the rotation angle θ is greater than or equal to the first threshold θu (NO at step ST23), the second signal generator 35 generates the second pulse signal Pb (step ST26). After generating the second pulse signal Pb (ST26), the second signal generator 35 corrects the rotation angle θ to the first value θp (step ST27).

Although the flowchart varies depending on the order of the thresholds and the predetermined angle, the essence of the process remains the same. When the first pulse signal Pa is generated while the rotation angle θ is within a predetermined range, the rotation angle θ is corrected to a first value. In the embodiment described with reference to FIGS. 4 and 5, the "predetermined range" includes a range greater than or equal to the first threshold θu and less than the predetermined angle θc and a range less than the second threshold θd. Also in the embodiment described with reference to FIGS. 4 and 5, the first value is zero. In the embodiment described with reference to FIGS. 7 and 8, the "predetermined range" is greater than or equal to the first threshold θu and less than the second threshold θd. Also in the embodiment described with reference to FIGS. 7 and 8, the first value θp is a predetermined value that is greater than or equal to the first threshold θu and less than the second threshold θd.

On the other hand, when the first pulse signal Pa is generated while the rotation angle θ is out of the predetermined range, it is highly likely that the first pulse signal Pa is erroneously generated based on noise. Accordingly, when the first pulse signal Pa is generated while the rotation angle θ is outside of the predetermined range, the rotation angle θ is not corrected.

When the first pulse signal Pa is generated while the rotation angle θ is greater than or equal to the first threshold θu and less than an expected value, the second signal generator 35 generates the second pulse signal Pb. On the other hand, when the first pulse signal Pa has not been generated even when the rotation angle θ reaches the expected value, the second signal generator 35 generates the second pulse signal Pb. With this configuration, the second pulse signal Pb is infallibly generated once in each period even if the first pulse signal Pa is not generated. In the embodiment described with reference to FIGS. 4 and 5, the expected value is the central angle θc of an arc formed by the commutator segment 20a. In the embodiment described with reference to FIGS. 7 and 8, the expected value is the first value θp that is a predetermined value greater than or equal to the first threshold θu and less than the second threshold θd.

Further, when the first pulse signal Pa is generated while the rotation angle θ is greater than or equal to the expected value and less than or equal to the second threshold θd, the second signal generator 35 does not generate the second pulse signal Pb. With this configuration, the second pulse signal Pb is generated only once in each period. In other words, the second pulse signal Pb is not generated multiple times in one period.

Embodiments of the present invention are described above. However, the present invention is not limited to the above-described embodiments, and variations and modifications may be made without departing from the scope of the present invention. Also, features described separately in the above embodiments may be combined freely unless they technically contradict each other.

What is claimed is:

1. A motor module, comprising:
a motor including a commutator; and
an apparatus that is attached to the motor and obtains information on rotation of the motor, wherein
the apparatus includes
a rotation angle calculator that calculates a rotation angle of the motor based on a voltage between terminals of the motor and an electric current flowing through the motor,
a first signal generator that generates a first signal based on a ripple component included in the electric current flowing through the motor,
a second signal generator that generates a second signal based on the first signal and the rotation angle, and
a rotation information calculator that calculates the information on the rotation of the motor based on an output from the second signal generator; and
the second signal generator generates the second signal and outputs a command to reset the rotation angle to zero to the rotation angle calculator in each of a case where the rotation angle reaches a predetermined angle and a case where the rotation angle is greater than or equal to a first threshold when the first signal is received, the first threshold being less than the predetermined angle.

2. The motor module as claimed in claim 1, wherein the rotation angle calculator calculates the rotation angle by integrating rotational angular velocities of the motor that are calculated based on the voltage between the terminals of the motor and the electric current flowing through the motor.

3. The motor module as claimed in claim 1, wherein the predetermined angle is a central angle of an arc formed by a commutator segment.

4. The motor module as claimed in claim 1, wherein the second signal generator also outputs, to the rotation angle calculator, the command to reset the rotation angle to zero if the rotation angle is less than a second threshold when the first signal is received, the second threshold being less than the first threshold.

5. The motor module as claimed in claim 1, wherein the second signal generator does not generate the second signal if the rotation angle is less than the first threshold when the first signal is received.

6. A method performed by an apparatus of a motor module that includes the apparatus and a motor including a commutator, the method comprising:
calculating a rotation angle of the motor based on a voltage between terminals of the motor and an electric current flowing through the motor;
generating a first signal based on a ripple component included in the electric current flowing through the motor;
generating a second signal based on the first signal and the rotation angle; and
calculating information on rotation of the motor based on the second signal,
wherein the second signal is generated and a command to reset the rotation angle to zero is output in each of a case where the rotation angle reaches a predetermined angle and a case where the rotation angle is greater than or equal to a first threshold when the first signal is received, the first threshold being less than the predetermined angle.

7. A motor module, comprising:

a motor including a commutator; and an apparatus that is attached to the motor and obtains information on rotation of the motor, wherein the apparatus includes a rotation angle calculator that calculates a rotation angle of the motor based on a voltage between terminals of the motor and an electric current flowing through the motor, a first signal generator that generates a first signal based on a ripple component included in the electric current flowing through the motor, a second signal generator that generates a second signal based on the first signal and the rotation angle, and a rotation information calculator that calculates the information on the rotation of the motor based on an output from the second signal generator; and the second signal generator outputs a command to reset the rotation angle to zero to the rotation angle calculator if the rotation angle reaches a predetermined angle, and generates the second signal and outputs a command to correct the rotation angle to a first value to the rotation angle calculator if the rotation angle is less than the first value and greater than or equal to a first threshold when the first signal is received, the first value being less than the predetermined angle and greater than the first threshold.

8. The motor module as claimed in claim 7, wherein the second signal generator does not generate the second signal if the rotation angle is less than the first threshold or greater than or equal to the first value when the first signal is received.

9. The motor module as claimed in claim 7, wherein the second signal generator also outputs, to the rotation angle calculator, the command to correct the rotation angle to the first value if the rotation angle is greater than or equal to the first value and less than a second threshold when the first signal is received, the second threshold being greater than the first value and less than the predetermined angle.

10. The motor module as claimed in claim 7, wherein the second signal generator also generates the second signal when the rotation angle reaches the first value before the first signal is received.

* * * * *